TELEPHONE AUXILIARY AMPLIFYING DEVICE

Filed March 1, 1946

INVENTOR.
ARTHUR T. McWANE
BY Henry L. Jennings
ATTORNEY

Patented Mar. 28, 1950 2,501,955

UNITED STATES PATENT OFFICE 2,501,955

TELEPHONE AUXILIARY AMPLIFYING DEVICE

Arthur T. McWane, Birmingham, Ala.

Application March 1, 1946, Serial No. 651,169

4 Claims. (Cl. 179—1)

My present invention relates to an improvement in an auxiliary telephone amplifying device and has for an object the provision of amplifiers, speakers and a microphone for use with a telephone which permits the user of the telephone to carry on a conversation without the necessity of holding either the transmitter or receiver, thus to free both the user's hands.

Another object is to provide amplifiers, speakers and a microphone of the type indicated which is so constructed and arranged that no physical electrical connections with the telephone or its circuits are necessary, but in which the receiver and transmitter of the telephone are operably used therewith simply by placing them against the auxiliary device, as will be more fully explained herein.

A further object is to provide an auxiliary device embodying the features above enumerated which may be advantageously employed at one station of a telephone circuit, regardless of whether other stations are so equipped, and by means of which a plurality or multiplicity of persons are enabled both to hear the incoming conversation and to speak to the party at the other station without any physical contact with the telephone receiver or transmitter during such conversation. When two connected stations are each equipped with this device, group conferences can be conducted "over the phone" as each party in one group can converse with any member of or all of the other group while those not talking can hear the entire proceedings—and vice versa.

A further object is to provide an auxiliary device of the character designated in which the outgoing converation is fed acoustically into the transmitter of the telephone and the incoming conversation is picked up inductively at the receiver, and transmitted to the user through a radio type speaker, thus minimizing undesirable feed-back of signals within the amplifying device itself.

A still further object is to provide an auxiliary device of the character designated in which the apparatus necessary for its operation may be substantially all contained in one compact unit, and in which the parts are so arranged therein that when the hand set, receiver and transmitter of the usual telephone, is simply placed detachably in position thereon, no connections between the telephone and the auxiliary device are necessary, the physical arrangement of the unit being such that direct acoustical feed back into the telephone circuit is retarded.

Apparatus embodying features of my invention is illustrated in the accompanying drawing, forming a part of this application, in which Fig. 1 is an end view of my improved auxiliary device, partly in section, with a telephone hand set detachably in place thereon;

Figures 1, 2, 3:
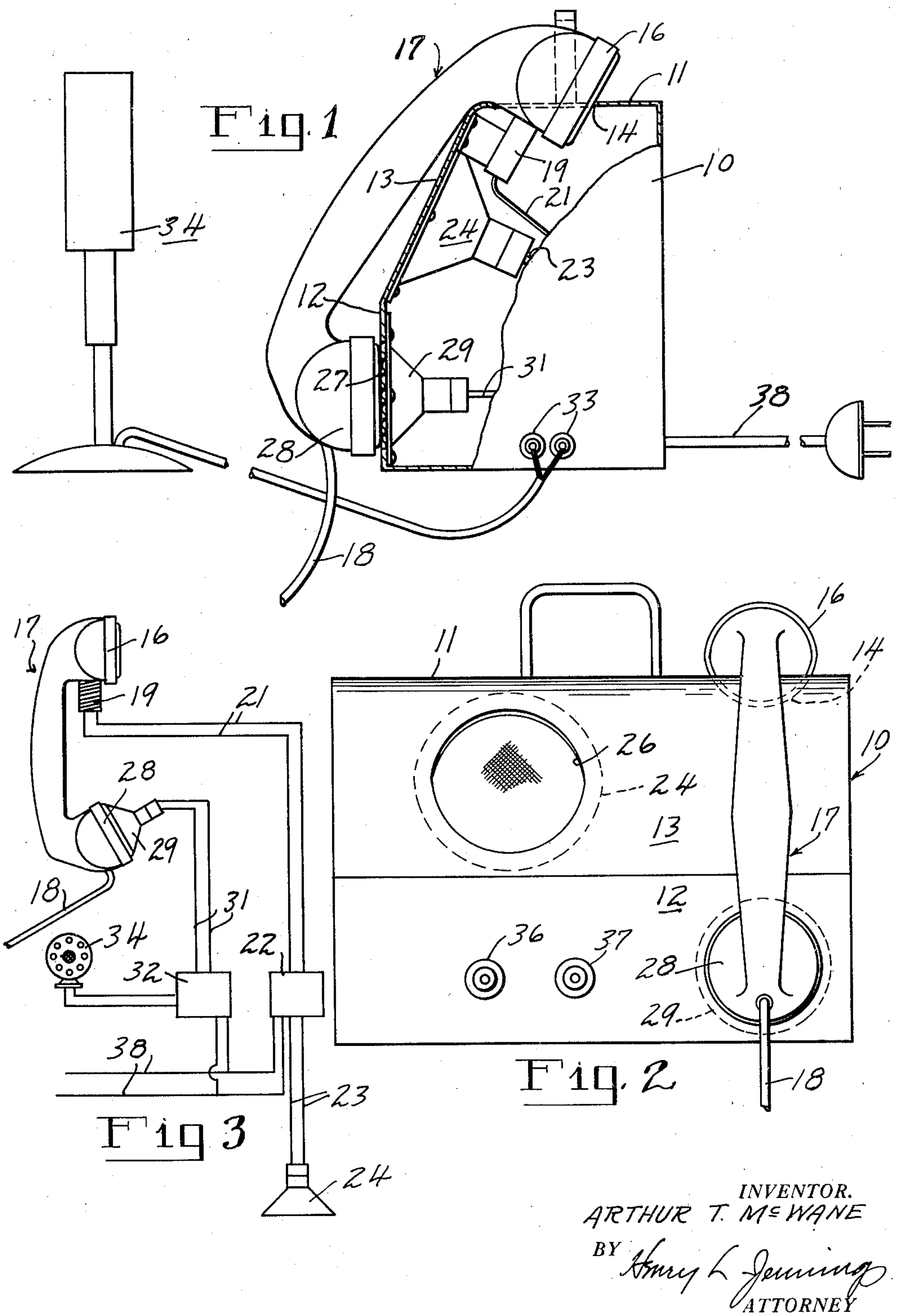
Fig. 2 is a front view.
Fig. 3 is a diagrammatic wiring diagram omitting any showing of volume control means in the transmitting and receiving circuits.

Referring now to the drawing for a better understanding of my invention, my improved auxiliary device comprises a case 10 which has a horizontal top portion 11 and vertical front portion 12, the portions 11 and 12 being joined by a sloping front section 13. The top 11 is provided with a concave cradle-like support 14 which is adapted to receive a portion of the receiver 16 of the usual telephone hand set 17. The usual telephone equipped multi-wire cable 18 leads from the telephone hand set 17 and connects to the external standard telephone circuits, not shown, in the manner well understood.

Within the case 10 and in close proximity to the receiver 16, when placed thereon, is mounted a small induction coil 19, the circuits 21 of which lead to an amplifier 22 (see Fig. 3) mounted in the case 10 and thence through circuits 23 to a speaker 24, secured to the sloping front section 13, behind an opening 26 therein. Mounted behind an opening 27 in the vertical section 12, and in position to be covered by transmitter 28 of the hand set 17, is a second speaker 29. Circuits 31 lead from the speaker 29 to a second amplifier 32, also mounted in the case 10, which is in turn connected through a pair of outlets and jacks 33 to a microphone 34.

A pair of volume controls 36 and 37 are interposed in the two amplifier circuits in the manner well understood in the art, so that the volume of incoming or outgoing conversations may be varied for proper modulation of the speaker's voice. Power for the amplifier is supplied by means of wires 38 from any suitable source either A. C. or D. C., not shown.

From the foregoing, the operation of my invention will be readily understood. When a number is dialed or when a call is received at a station equipped with my improved auxiliary device, the user simply lifts the hand set 17 from the telephone base and places it on the case 10 in the position shown in the drawing, whereupon incoming sounds are picked up inductively by the induction coil 19 from the receiver 16 and being amplified by the amplifier 22, are again translated into sound by the speaker 24 thereby enabling all within reasonable distance of my device to hear the incoming call. The user, with both hands free, then speaks into the microphone 34. The impulses set up thereby are transmitted to the amplifier 32, thence through the circuits 31 to the speaker 29, where they are acoustically relayed into the transmitter 28 of the hand set 17. Thereupon the voice of any one or more participating in the conversation is clearly transmitted to the party or parties at the other station. It will be obvious that in order for a number of people within reasonable voice range of my auxiliary device to use the same in a two way conversation, it is only necessary to regulate the volume of the receiving and transmitting circuits by means of the controls 36 and 37. In actual practice, I have found that a device constructed in accordance with my invention enables a very clear and interference-free conversation to be carried on by a multiplicity of persons. Feed back is minimized because the induction coil 19 is not affected by sound, being affected only by electro-magnetic impulses set up in the receiver 16 of the hand set. Feed back within the device of outgoing conversations is retarded by the construction shown because the induction coil is not responsive to sound waves and is physically removed from the speaker 29.

From the foregoing, it will be apparent that I have devised an improved auxiliary device for telephones, in which the arrangement of parts is such that a plurality or multiplicity of persons may engage in a two-way conversation without the necessity of making physical electrical connections to the telephone circuits. The device may be used to carry on a multiple or personal conversation without holding the telephone hand set in the hand and yet, whenever it is desired the hand set may be used in the ordinary manner without the device, as it is in no manner attached to the device. The hand set may be placed on the device, or placed on the phone base or held to the ear at will. While the type of amplifier circuits to be used is not especially material, I prefer to use the type known as an "A. C.-D. C." circuit. This circuit is preferable in that it eliminates the transformer required in other types, which, if placed in close proximity to the induction coil 19 would produce an undesirable hum in the speaker 24. However, if it is desired to use amplifying circuits embodying transformers, it will be obvious that the transformer itself may be physically removed from the induction coil, and the necessary electrical connections made by lead in wires, thus eliminating magnetic disturbance of the induction coil. In order to further retard acoustic feed back between speaker 24 and microphone 34, I prefer to use a partially directional microphone of the velocity type, and to so place the microphone with respect to the speaker when the device is in use that sounds coming from the speaker do not directly enter the microphone.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims. It will further be obvious that my invention is adapted for use with other types of telephones than that specifically shown, such as the old style wall telephones or pedestal type telephone.

What I claim is:

1. In a two way conversation device for use with a telephone embodying a hand set having a receiver and a transmitter, a case having a top, a front wall comprising a substantially vertical portion at the bottom and a backwardly sloping extension joined to the top, supporting means on the top of the case for detachably laying the receiver thereon, a non-acoustic induction coil in the case physically detached from the receiver and in inductive relationship to the receiver when the latter is laid on the case, a speaker secured to the sloping front wall of the case and facing outwardly of the case, circuits connecting said induction coil and said speaker, there being an opening in the vertical portion of said wall positioned to lie behind the transmitter of the hand set when the latter is detachably positioned on the case, a second speaker behind said opening adapted to impress sound emitted thereby onto the transmitter, and means including an amplifier for picking up and reproducing in the second speaker sounds impressed on the microphone.

2. In apparatus of the character described including a telephone hand set having a receiver and a transmitter, a case having a top and a front, a cradle support for the telephone receiver formed in the top of the case, a first speaker mounted in the case and opening through the lower section of the front wall in position to transmit sound waves into the transmitter of the hand set when the latter is on its support, a second speaker mounted in the case in position to transmit sound waves outwardly of the case, a non-acoustic induction coil physically detached from the receiver mounted in the top of the case to lie adjacent the periphery of the receiver when the latter is on its support, an amplifier, circuits connecting the amplifier with the induction coil and second speaker, a microphone, a second amplifier, and other electric circuits connecting the second amplifier to the microphone and first speaker.

3. In apparatus of the character described including a telephone hand set having a receiver and a transmitter embodying a diaphragm, a case having a top and a front wall with an inclined upper section and a vertical lower section, a cradle-like support for the hand set in the top of the case shaped to receive and retain the receiver of the hand set when the latter is placed thereon, a non-acoustic induction coil fixedly mounted in the case to lie adjacent the periphery of the receiver in inductive relation therewith when the hand set is on its support, a first speaker mounted in the case and opening outwardly thereof, an amplifier, circuits connecting the amplifier with the induction coil and first speaker, a microphone, a second speaker mounted to emit sound waves through the lower vertical section of the front into the transmitter of the hand set, a second amplifier, and other circuits connecting the second amplifier with the microphone and second speaker, said case being constructed and arranged to hold the diagram of the transmitter substantially vertical.

4. In a device for use with a telephone having a hand set embodying a receiver and a transmitter, a case, a front wall on the case embodying a substantially vertical lower section, means at the top of the case for engaging the receiver end of the handset thereby to support the handset with the transmitter adjacent the vertical section of the front wall, a non-acoustic induction coil mounted in the case in position to lie adjacent the periphery of the receiver in inductive relation thereto when the receiver is supported from the case, said induction coil being physically detached from the receiver, a loudspeaker in the case, an amplifier, a microphone, electric circuits connecting the amplifier with the loudspeaker and microphone, a second loudspeaker in the case in position to transmit sound waves outwardly of the case and impress the same on the transmitter, a second amplifier, and other electric circuits connecting the second amplifier with the microphone and second loudspeaker.

ARTHUR T. McWANE.

REFERENCES CITED

The following references are of record in the file of this patent:

UNITED STATES PATENTS

| Number | Name | Date |
|---|---|---|
| Re. 22,198 | Loewe | Oct. 6, 1942 |
| 2,005,973 | Hellmann | June 25, 1935 |
| 2,079,089 | Varley | May 4, 1937 |
| 2,160,829 | Cherry | June 6, 1939 |
| 2,204,529 | Cooley | June 11, 1940 |
| 2,214,992 | Chevassus | Sept. 17, 1940 |
| 2,402,341 | Patterson | June 18, 1946 |